United States Patent [19] [11] 4,139,473
Alldredge [45] Feb. 13, 1979

[54] FILTER

[76] Inventor: Robert L. Alldredge, 130 Pearl St., Apt. 1108, Denver, Colo. 80203

[21] Appl. No.: 832,221

[22] Filed: Sep. 12, 1977

[51] Int. Cl.² .................................................. B01D 23/24
[52] U.S. Cl. .................................... 210/279; 210/290; 220/85 B
[58] Field of Search .................. 210/75, 80, 81, 189, 210/266, 269, 279, 290; 220/85 B, 93; 23/285; 137/264

[56] References Cited

U.S. PATENT DOCUMENTS

| | | | |
|---|---|---|---|
| 2,098,903 | 11/1937 | Slidell | 210/290 X |
| 3,126,333 | 3/1964 | Williams | 210/275 X |
| 3,387,630 | 6/1968 | Routson | 210/266 X |
| 4,001,113 | 6/1977 | Schoenrock et al. | 210/189 X |
| 4,048,068 | 9/1977 | Hirs | 210/290 X |

Primary Examiner—Ferris H. Lander

Attorney, Agent, or Firm—Kyle W. Rost

[57] ABSTRACT

An upwash, upflow, graded sand filter has a reusable imperforate diaphragm on the top of the graded filter media and an inlet for pressurized fluid above the diaphragm for inflating the diaphragm against the media during filter stage. The filter housing is flared upwardly and outwardly at selected portions to reduce the velocity of upflowing liquid during wash stage for improved grading of the filter media. A natural foraminous layer may be self-grading at the top of the filter media, allowing a circumferential outlet for filtrate. A layer of fine, dense filter media may also be used to increase the size range of media particles in the filter. Special diaphragms may be composed of individual leaflets that float above a dirty-liquid outlet during wash stage, but that sink due to a change in density when the filter is pressurized for filter stage.

18 Claims, 11 Drawing Figures

FILTER

BACKGROUND OF THE INVENTION

1. Field of the Invention

The invention relates to liquid purification. More specifically, the invention relates to a filtering apparatus for water and other liquids. An up-flow, up-wash sand filter is disclosed.

2. Description of the Prior Art

Sand filters are well known as filtering devices for water and many other liquids. Several configurations of sand filters are well known, including down-flow filters and up-flow filters.

Down-flow filters represent the simplist form, consisting of a tank containing a filtering medium such as sand and having a top inlet for pressurized water and a bottom outlet for filtered water. Where the filtering medium is sand, the sand will be of various sizes. To remove the accumulated dirt from the sand, water is pumped up through the sand at a velocity sufficient to lift the sand and roll it around. At the conclusion of washing, the sand settles naturally and, accordingly, is graded in the filter with the fastest settling particles at the bottom and the slowest settling particles at the top. If all particles are of substantially the same material, the largest particles are at the bottom of the filter and the smallest are at the top. When the filtering operation is taking place, the finest particles in the liquid are filtered out by immediate contact with the finest particles of sand at the top of the filter, and the remaining solids merely build up on the top of the filter. Very little material is caught in the bed of sand.

Typical operating conditions for a standard down-flow sand filter are flow rates of ½ to 1½ gpm/sq. ft. of cross section and a dirt holding capacity of ½ to 1 lb./sq. ft. of cross section. Most of the pressure drop is due to passage across the thin layer of filtered solids in the upper bed of the filter.

Representative art teaching down-flow filters includes U.S. Pat. No. 184,024 to Stewart, U.S. Pat. No. 178,972 to Stewart, and U.S. Pat. No. 454,340 to Fulton.

The disadvantages of down-flow filters have suggested that an up-flow filter is a far more practical filtering device, but up-flow filters present a number of problems. The greater efficiency of an up-flow filter is attributed to the same classification of particles that occurs in the washing cycle of down-flow filters: the largest particles of sand settle to the bottom of the filter and the smallest at the top. Then, as the liquid to be filtered is pumped into the sand from the bottom, the courser impurities are trapped in the courser layer of sand and the finer impurities pass into finer layers of sand before being trapped.

Typical operating conditions for a standard up-flow sand filter are flow rates of 8-12 gpm/sq. ft. cross section and dirt holding capacities of up to 10 lb./sq. ft. cross section. The filterable solids are distributed throughout the sand and the pressure drop is likewise distributed across the entire body of sand. Thus, if the sand can be held in place, the flow rates can be much higher than in a down-flow filter for the same pressure drop.

A number of attempts in the prior art have faced the problem of holding the sand in place during high filtering rates in an up-flow filter. U.S. Pat. No. 620,621 to Veazie teaches containing the sand layer between an upper and lower foraminous diaphragm, with the upper diaphragm being connected to a device for applying pressure to sand layers to hold the sand particles close together for efficient filtering. U.S. Pat. No. 3,278,031 to Rosaen teaches a piston arrangement for compressing the filtering medium under a perforated plate, and the pressure of the piston is released to allow medium to expand for washing. U.S. Pat. No. 2,723,761 to Van Der Made et. al. teaches an up-flow filter that routes some of the liquid to the top of the filter to supply compacting pressure to the bed of filtering media. U.S. Pat. No. 3,202,286 to Smit teaches the use of an open grate across the top of the filtering media to hold the media in place through natural bridging between elements of the grate.

A problem found in prior art up-flow filters is that the filter rate is limited by the need to hold the top layers of the filtering media in place. The foraminous devices used on the upper layer of the media in the Veazie, Rosaen, and Smit patents will yield some of the filter material through the perforations of the hold-down device if the flow rate is high enough. Alternatively, if the hold-down device is pressurized to oppose high filter rates, as in the Van derMade et. al. patent, there is danger that the pressurized water will channel to the filtrate outlet, and all filtering action will immediately cease. If a mechanical hold-down device is created with small enough perforations to physically retain the filter media against high pressure without bridging of the media particles, the hold-down device itself may become the finest layer of filtering media and be subject to rapid clogging, or the upper layer of media may be required to be coarse enough that extremely thorough filter action cannot be achieved.

A further problem exists in cleaning an up-flow filter. It is desirable to loosen the beds of filter media and suspend each particle so that it can move freely, thereby releasing dirt trapped in the interstices. To accomplish this task in apparatus such as that taught in the Smit patent, it is necessary to use wash flow rates greater than filter flow rates, often requiring a separate wash pump for the task and often requiring air in the wash liquid to lift the media. Furthermore, in all prior up-flow up-wash graded filters, the wash rate is limited according to the rate that will lift the finest particles of the filter media completely out of the filter housing. During an up-wash process, the finest media particles form a visible plane at the top of the wash flow, and the adjustment of flow rates between a rate that will retain the particles and a rate that will wash the particles away must be carefully controlled.

Ideally, the filter media should be cheap and readily available, with sand being a preferred material. In the up-wash process, it is known that the media will be self-sorting into layers graded according to the size of the particles when all particles are of similar density, the larger particles settling at the bottom of the filter and the smaller particles at the top. If in rinsing the filter the finest particles are to be retained and not blown out the top of the filter with the dirt, then there is an additional limitation that the largest particles must be of sufficiently small size that they can be lifted and suspended in the wash water while the wash flow rate is maintained below the rate that will remove the finest particles from the top of the filter. Ordinarily, the settling rates of various sized particles of similar density are such that maximum size ratio between the largest and smallest media particles is approximately 3:1, which is not a very great range.

The present invention seeks to solve these and other problems of the prior art, as will be disclosed below.

SUMMARY OF THE INVENTION

An up-flow up-wash sand filter has a body containing filter media during normal filter stage operation that is flared upwardly, and a portion of the filter above the normal operating level of the media is more broadly flared upwardly, the latter portion receiving the upper part of the filter media during up-flow washing. An elastic diaphragm having greater surface area than the area of sand contacted during filtration stage is connected to the top of the upper flared portion of the filter. The diaphragm is pressurized on its upper surface to compress the sand of the filter media during filtration. The sand in the filter is naturally graded during washing stage and may have an upper layer of extra fine, dense material. Alternatively, the upper layer may be coarse material of low density, either more or less dense than water, forming a natural foraminous layer that holds the underlying sand in place. The diaphragm may have alternative forms including "Cartesian devil" pillows or flat leaflets loosely placed above the sand charge.

An object of the invention is to increase the available size ratio between the smallest and largest filter media particles in a self-grading up-flow up-wash sand filer, thereby improving the dirt holding capacity of the filter as well as increasing the thoroughness of available filtration in a single filter.

A further object is to create a diaphragm hold-down that does not require stretching and that can be recessed easily for wash operations.

Another object is to increase the performance of a filter by drastically increasing the size range of the particles without simultaneously increasing the range of settling velocities.

DESCRIPTION OF THE PREFERRED EMBODIMENT

Figure 1:
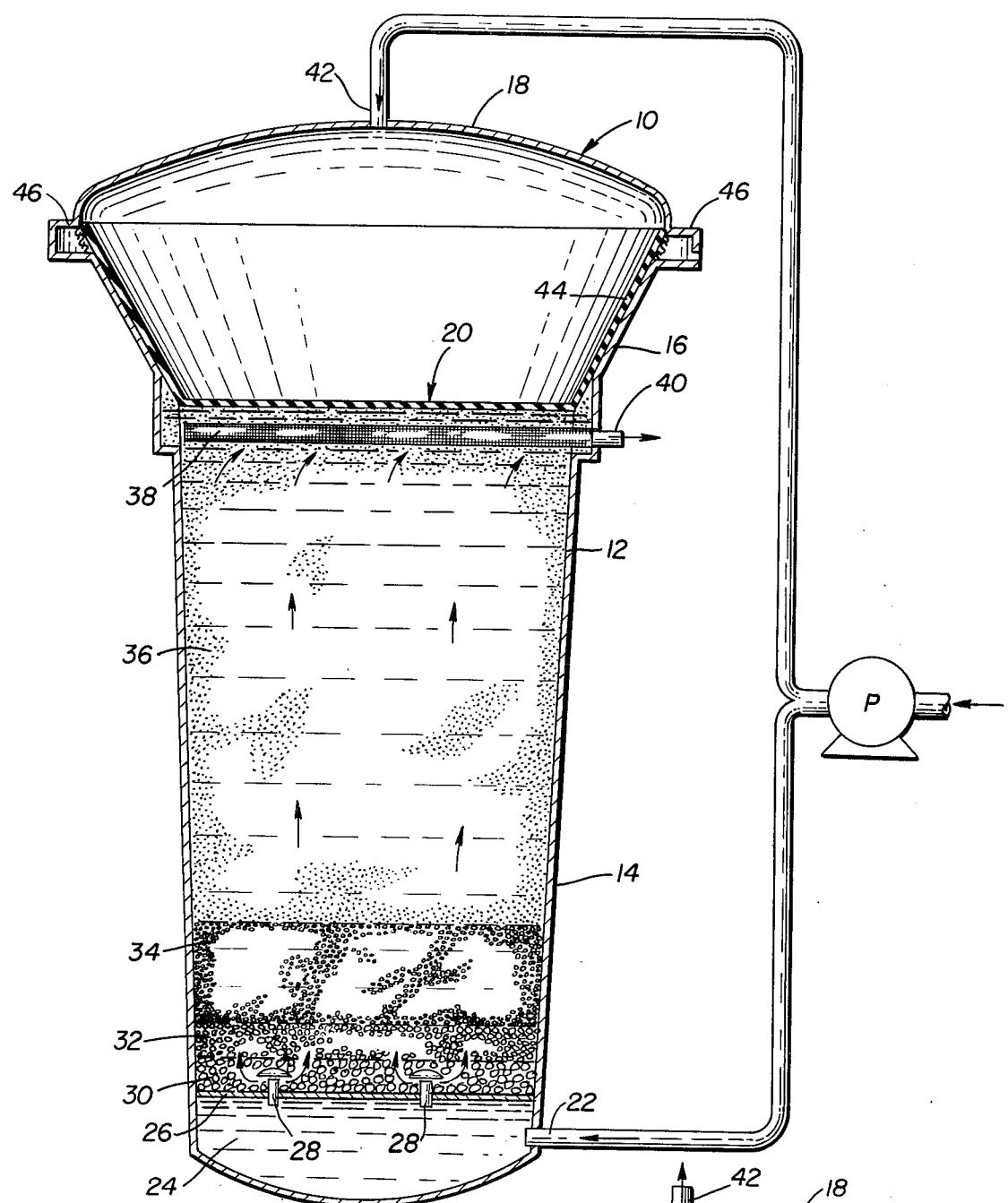
FIG. 1 is a vertical cross-sectional view of the filter showing the layers of granular filter media in filter stage.

The sand filter 10 is best shown in FIG. 1, wherein the filter housing 12 has a lower portion 14 that may be slightly upwardly flared and an upper portion 16 that is broadly flared, terminating in a domed top 18. Contained within the housing 12 is diaphragm 20 connected to the sides of the upper portion 16 near top 18. Near the bottom of the filter is liquid inlet 22 feeding chamber 24, which is closed at its upper end by media supporting plate 26 having a plurality of liquid distributors 28 carried thereon.

Figure 2:
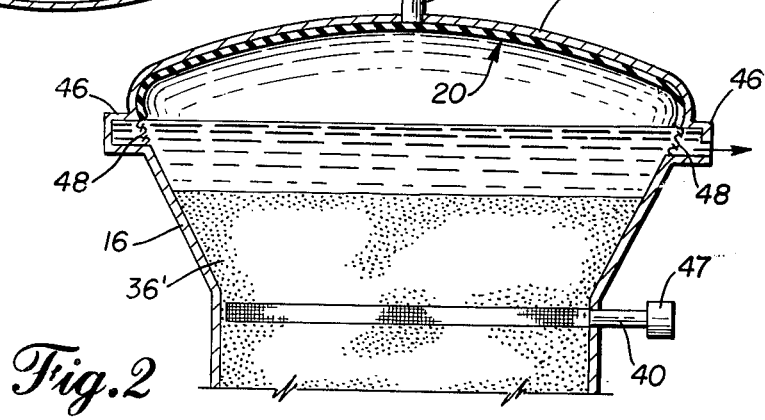
FIG. 2 is a vertical cross-sectional view of the upper portion of FIG. 1 showing the diaphragm and filter media in wash stage.

The housing 12 contains granular filtering media that is graded from coarse to fine according to the natural settling velocities of the media material in the embodiments of FIGS. 1 and 2. Immediately above plate 26 is a coarse layer 30 of, for example, 1¼ to 1½ inch gravel. Above layer 30 is layer 32 of, for example, ⅜ to ⅝ inch gravel, which in turn is covered by layer 34 of 6 to 10 mesh (2-3 mm) sand. The remainder of portion 14 is filled with a finer material 36 such as 12-20 mesh (1-2 mm) sand. Buried in the top of layer 36 is foraminous outlet means such as perforated or screened tube 38 having outlet 40 for the filtrate. Diaphragm 20 is pressed downwardly against the layers of filtering media at a level approximately equal to the interface between lower portion 14 and upper portion 16 when the filter is in operation by means of liquid or gas pressurizing means entering upper portion 16 through conduit 42 in top 18. When the diaphragm 20 is pressed against the filtering media as shown in FIG. 1, the sides 44 of the diaphragm are also pressed against the wall of flared upper housing 16, sealing dirty liquid overflow 46 located in the upper region of housing 16 but below the connection of the diaphragm 20.

Typical dimensions of a filter as illustrated in FIG. 1 include a lower diameter of portion 14 of 3½ feet and an upper diameter of portion 14 (also the lower diameter of portion 16) of 4 feet. The broadest part of portion 16 adjacent top 18 may be 6 feet. The vertical height may be subdivided with 12 inches for chamber 24, four inches for layer 30, eight inches for layer 32, twelve inches for layer 34, fifty-eight inches for layer 36, twenty-two inches for upper portion 16, and twelve inches for the dome of top 18.

During filtration, shown in FIG. 1, the liquid to be filtered, most commonly water, is pumped into chamber 24 via inlet 22 under pressure from pump P. The water passes through distributors 28 and flows upwardly through layers 30-36, each layer capturing progressively finer particles from the water. The filtrate then enters foraminous tube 38 and exits the filter through 40. Elastic diaphragm 20 is pressed against the top of the media with whatever force is required to hold the media in place against the flow of the filtrate. Pump P may supply the required pressure. Flow rates of twenty gallons per minute per square foot of media have been successfully used in tests of the filter.

During sand washing stage, shown in FIG. 2, outlet 40 is sealed, for example by closing a valve 47, and diaphragm 20 is drawn upwardly into top 18 by suction applied through conduit 42, or alternatively, the pressure through conduit 42 may simply be released. When the diaphragm is so raised, liquid overflow 46 is in free communication with the interior of housing 12. The same external source of pressurized water used during filtration stage may supply pressurized water during wash stage, the water flowing as before through inlet 22 and upwardly through the layers of media. The upflow of water may be at a sufficient rate to loosen and suspend the sand and other media, freeing captured dirt particles and allowing them to flow out of the filter through dirty liquid overflow 46. With diaphragm 20 released during wash stage, pump P may be operated at the same output as during filtration, since washing usually will require less water per square foot of filter media than actual filtering.

The flare of portion 14 results in reduced velocity of the upwardly flowing liquid as the liquid travels from the narrow bottom chamber 24 to the relatively wider upper end of portion 14 containing finer sand layer 36. During filtration stage, this flare produces a more even distribution of the liquid passing through the fine media and increases dirt holding capacity of the filter, as compared to a standard cylindrical filter housing. during wash stage, the flare allows more uniform lift of the various sized media since the higher velocity of the wash liquid at the bottom of the housing must suspend relatively larger media, while the lower velocity liquid at the top of the media must suspend relatively smaller media. A coarser range of media may be employed in the filter 10 than in a similar filter of cylindrical design, with size ratio of 1:10 being achievable by designing the proper flare into portion 14.

Upper portion 16 is also flared, but to a greater degree than portion 14. During normal operation in filter stage, the media is not present in upper portion 16, but the layers of media are vertically expanded during wash stage and some of the finest media 36' enters portion 16. In a conventional filter, the finest media forms a distinct plane during up-wash, and in filter 10 the greater flare of portion 16 provides a sharp dividing line in flow velocity, substantially reducing the opportunity for these fine particles to be blown out the top of the filter through coarse screen 48 covering overflow 46. Pump P can operate at the same or slower rate for washing as for filtering, and due to the superior liquid/media separation in portion 16, the exact adjustment of the wash rate is far less important to retaining layer 36' than in conventional filters.

The flare of portion 16 would also be a substantial advantage during filtration with a grate-type apparatus such as that taught in U.S. Pat. No. 3,202,286 to Smit, incorporated herein by reference for this teaching.

The settling velocities of the media particles must be within a narrow range if material classification is to be produced and all layers of sand made turbulent while still not blowing the fine particles of media out of the filter. The performance of filter 10 or of any upflow sand filter can be improved by drastically increasing the size range of media particles, for example to 20:1, without simultaneously increasing the range of settling velocities. This can be accomplished by adding a layer of finer, denser particles than the material used for the remainder of the media.

Figure 3:
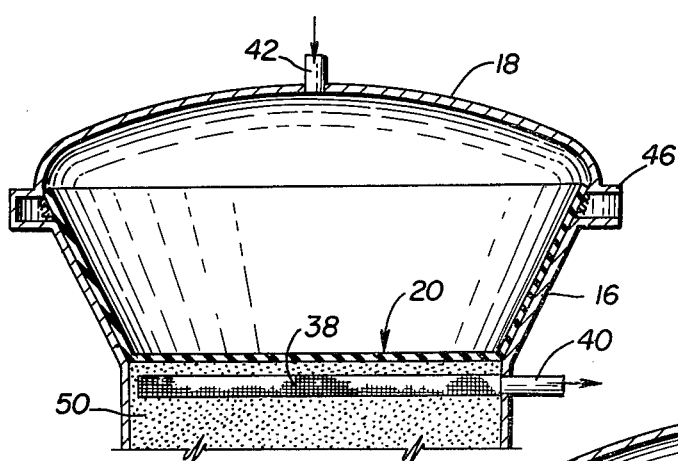
FIG. 3 is a view similar to FIG. 2, showing a first modified embodiment of the invention in filter stage.

The embodiment of FIG. 3 shows a modification of FIG. 1 in which a layer of filtering media 50 is on top of layer 36 and surrounds tube 38. Layer 50 is finer and denser particles than layer 36 and has a specific gravity greater than the sand below it. During the up-wash sand cleaning stage, the fine dense material of layer 50, for example ½-1 mm high density sand or magnetite, is normally graded into the top layer of the sand charge of the media.

The embodiments of FIGS. 4–7 eliminate foraminous tube 38 fixed to the filter and substitute in its place a perforated screen 52 in the upper end of portion 14, circumferentially surrounded by annular collar 54 having outlet 40' for the filtrate.

Figure 4:
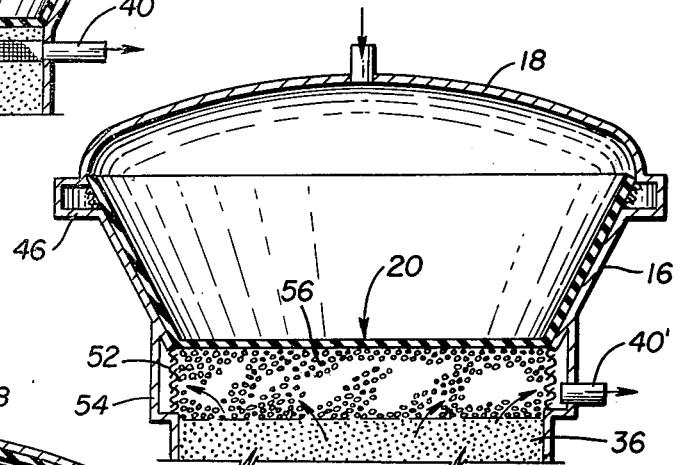
FIG. 4 is a view similar to FIG. 2, showing a second modified embodiment of the filter in filter stage.
Figure 5:
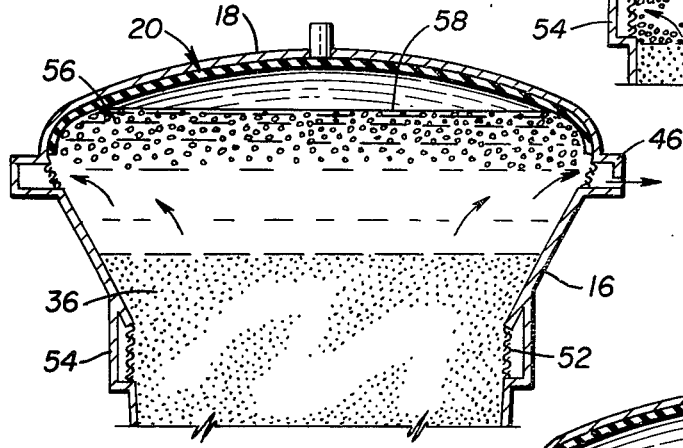
FIG. 5 is a view similar to FIG. 2, showing the second embodiment in wash stage.

In the embodiment of FIG. 4 sand layer 36 is topped with a foraminous layer 56 of relatively larger, lighter density material, such as ⅛ inch beads that may float on the filtrate liquid or be non-floating but of lower specific gravity than the sand of layer 36. Alternatively, layer 56 may be a foraminous separator attached directly to the lower face of diaphragm 20. During filtration stage, the layer 56 will perform the function of receiving filtrate from layer 36 while holding the sand of layer 36 in place, due to bridging of the sand between adjacent particles of layer 56. During sand cleaning stage, as shown in FIG. 5, the beads of floatable layer 56 will raise above the level of overflow 46, floating at the upper level 58 of the water. As explained in connection with FIG. 2, the lower layers of filter media are loosened and lifted, but the flaring of portion 16 prevents the finer sand from being washed out of the filter with the loosened dirt. At the conclusion of the washing stage, the floating beads settle on top of the sand layer 36 and are pressed in place by diaphragm 20. If, in the alternative, the layer 56 is attached to the diaphragm, then the layer need not actually float but will be raised by the physical movement of the diaphragm during wash stage into domed top 18.

Figure 6:
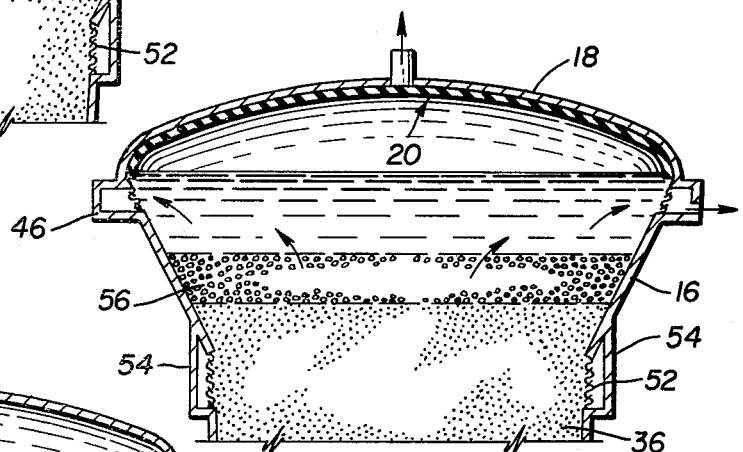
FIG. 6 is a view similar to FIG. 2, showing a variation of the second embodiment in wash stage.

If the coarse beads of layer 56 are not floatable, then during wash stage the condition of the filter will be as illustrated in FIG. 6, with layer 56 suspended above the sand of layer 36 but remaining below the level of overflow 46. The coarseness of the beads in layer 56 should be adequate to be caught by screen 48, if necessary.

Figure 7:
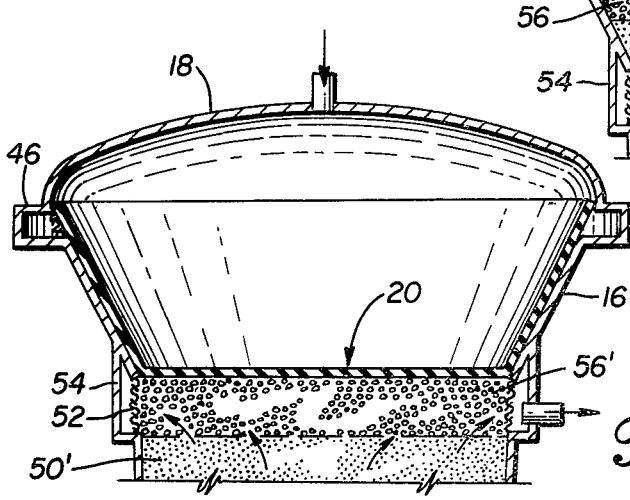
FIG. 7 is a view similar to FIG. 2, showing a third modified embodiment of the filter in filter stage.

Various combinations of the embodiments of FIGS. 3 and 4 are possible, as shown in FIG. 7 wherein fine sand layer 36 is topped by layer 50' of finer, denser material such as magnetite, which may itself include a self graded-range of particle sizes for extremely fine filtration. Layer 50' may extend upwardly to just below the lower edge of screen 52. Immediately on top of layer 50' is layer 56' of coarse, low density media similar to layer 56. If desired, layer 56' may include a range of increasingly coarse, increasingly low density beads that is self-grading upwardly in increasingly coarse layers. Layer 56' fills the area adjacent to screen 52 and acts as a moveable foraminous separator that is not fixed to the filter housing 12. During wash stage the layer 56' assumes a configuration similar to that shown in FIGS. 5 or 6.

Figure 8:
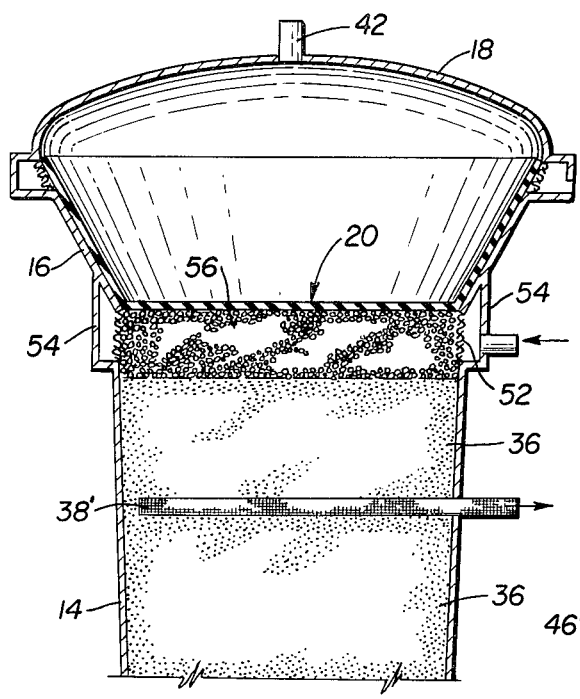
FIG. 8 is a vertical cross-sectional view of the upper part of the filter, showing a fourth modified embodiment in filter stage.
Figure 9:
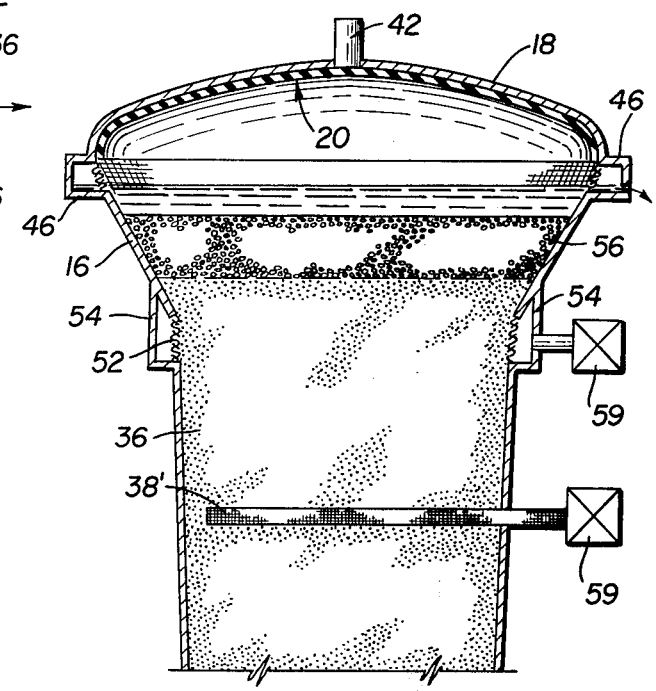
FIG. 9 is a vertical cross-sectional view similar to FIG. 8, showing the fourth modified embodiment in wash stage.

A further embodiment is shown in FIGS. 8 and 9 wherein a central foraminous tube 38' is fixedly attached to filter housing 12 near the center of sand layer 36. Below layer 36 are layers 30–34 as previously described, and on top of layer 36 is layer 56 of coarse, low density material. Annular collar 54 serves as a liquid inlet in addition to element 22, while central tube 38' is the outlet for the filtrate. In operation, the embodiment of FIG. 8 is a two-way filter receiving liquid both above and below the outlet, thereby handling a much greater liquid flow than with an upflow filter alone. Diaphragm 20 compresses the filter media to any desired degree, as previously explained, and may limit the degree of downflow in the two-way filter.

During sand cleaning stage, as shown in FIG. 9, flow through inlet 54 and outlet tube 38' are closed by appropriate sealing means 59, diaphragm 20 is moved into the domed top 18, and the up-wash water is pumped through inlet 22 to loosen and suspend the sand and other filter media particles as the water exits through overflow 46.

The diaphragm 20 has the ability in all of the illustrated embodiments to compress the filter media in opposition to the up-flow force of the filtrate. An ordinary diaphragm of approximately the same diameter as the sand surface is placed under high stress when the sand is greatly compacted, and such diaphragms have been found subject to premature failure. Accordingly, the diaphragm 20 has an unstretched surface area substantially greater than the area of sand that is contacted during filter stage. The difference in area enables the diaphragm to withstand far greater pressures applied to its upper surface and also provides a convenient means of removing the diaphragm from the top of the filter media during wash stage. The greater area and diameter of the diaphragm results in less severe stretching, if any, during sand compression because of added side material 44. Preferred materials for the diaphragm include rubber or other elastic material suited to resist chemical interaction with the liquid being filtered.

Figure 10:
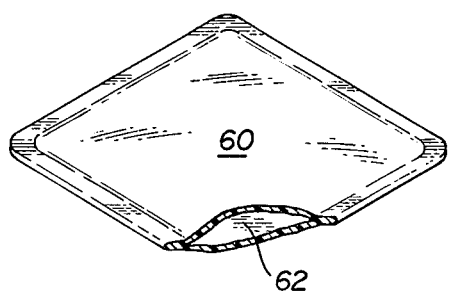
FIG. 10 is an isometric view in partial section of a diaphragm-forming pillow.

As an alternative to the diaphragm 20 formed from a single sheet of material, the diaphragm in filter 10 may be formed from a plurality of smaller independent pieces that, under pressure, rest against the top layer of filter media in an overlapping pattern to form a diaphragm. FIG. 10 illustrates a single smaller piece in the form of a gas filled pillow 60 that uses the "Cartesian devil" concept to perform as the diaphragm. Pillow 60 is slightly buoyant under atmospheric pressure, as when pressure through conduit 42 is released for wash stage. Thus, the pillow will float at the top of the wash water, as suggested by the floating layer 56 of FIG. 5. However, when pressure is applied through conduit 42, the gas 62 within pillow 60 is compressed and, as a result, the density of the pillow increases and the pillow sinks against the top layer 36 of filter media, as suggested by FIG. 4. A plurality of such pillows will overlap to form a layer that compresses the filter media as described for diaphragm 20.

Figure 11:
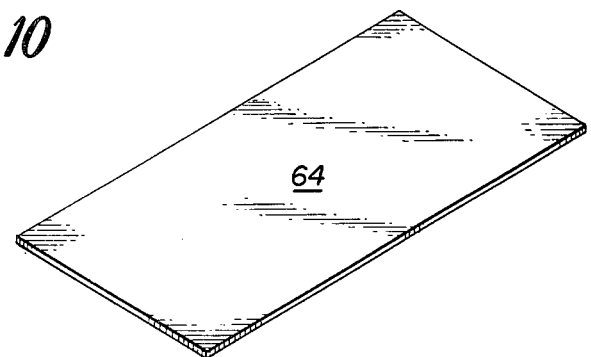
FIG. 11 is an isometric view of a diaphragm-forming leaflet.

Another alternative to diaphragm 20 is flat leaflet 64 of FIG. 11. Instead of having variable density under pressure, the leaflets 64 simply rely on the current of wash water to lift them above the filter media during wash stage. Similarly, the downward current of pressure water through conduit 42 urges the leaflets against the top of the filter media, where the leaflets overlap to form a diaphragm layer. A variety of plastic materials are especially suited for use as leaflets 64. The leaflets may assume a variety of shapes, including round, square, rectangular, oval, or elliptical.

While portions of the disclosure are directed to a filter housing with an uniform upward flare, it should be understood that intermediate non uniform flaring and belling of the housing is also within the scope of the invention. For example, the invention contemplates the use of less dense coarse materials in the lower layers of the media, with the housing locally flared or belled in the appropriate manner to retain these layers at their proper position through self grading during the wash stage. With such appropriate variation in the diameter of selected portions of the filter housing 12, the size range of media particles can be greatly increased and the accuracy of gradation improved.

Although the disclosure has been directed primarily to a filter using sand and gravel as the primary filtering media, the term "sand filter" is intended to generically denote filters using all varieties of granular filter media, including coal, garnet, and similar natural materials, as well as glass or plastic beads and similar synthetic materials.

I claim:
1. An improved upflow, upwash filter of the kind having granular filter media a portion of which is self-graded upwardly from coarse to fine, held in stationary position during filter stage; a filter housing containing said granular filter media within the bottom and sides of the housing; first liquid inlet means near the bottom of said granular filter media for admitting liquid to clean the granular media during wash stage; and liquid outlet means for discharging filtered liquid; wherein the improvement comprises:
   (a) a reuseable, substantially imperforate diaphragm means moveable between an applied position during filter stage for compressing and holding the filter media in place and a released position during wash stage for allowing the filter media to be lifted by liquid from said inlet means;
   (b) liquid overflow means located in said housing above the level of the granular filter media during filter stage for removing liquid flowing through the media during wash stage;
   (c) fluid admission means located above said diaphragm means for supplying pressurized fluid to the upper side of the diaphragm means during filter stage to move the diaphragm means from released to applied position;
   (d) fluid release means located above said diaphragm means for releasing pressure from the upper side of the diaphragm means during wash stage to allow the diaphragm to assume released position.
2. The filter of claim 1, wherein said diaphragm means comprises a body of flexible material having a substantially greater area when in released position than the surface area of the granular filter media contacted by the diaphragm means in applied position.
3. The filter of claim 1, wherein said diaphragm means comprises a sheet of material having a central portion of a size corresponding to the size of the surface of the granular filter media contacted by the sheet during filter stage and having a peripheral portion contacting the sides of the filter housing during filter stage, wherein said liquid overflow is covered by the peripheral portion during filter stage.
4. The filter of claim 1, wherein said filter housing is of the kind having a lower portion containing the filter media during filter stage and having an upper portion that is normally free of filter media during filter stage, but that receives a part of the filter media that is raised by up-flowing liquid during wash stage, the media normally rising for a limited distance within the upper portion, wherein the improvement further comprises:
   (a) a domed top at the upper end of said filter housing into which said diaphragm means is receivable during wash stage in released position; and
   (b) said liquid overflow being located in the side of said upper portion between the normal level of filter media in the upper portion during wash stage and the domed top.
5. The filter of claim 1, further comprising a top layer of filter media of coarser and lighter density particles than the media immediately therebelow, forming a self-graded uppermost foraminous layer held against the underlying media by said diaphragm means during filter stage.

6. The filter of claim 5, wherein said coarse layer of filter media further comprises buoyant particles floatable in the liquid at a spaced distance from the media immediately therebelow during wash stage.

7. The filter of claim 5, wherein said coarse layer of filter media is attached to the lower side of said diaphragm means for withdrawal from the top of the media therebelow when the diaphragm is in released position during wash stage.

8. The filter of claim 1, further comprising a top layer of filter media of finer, denser particles than the media immediately therebelow, forming a self-graded uppermost layer during wash stage.

9. The filter of claim 1, wherein said diaphragm means comprises a plurality of overlappable pillow-like units containing a compressible fluid, the density of said pillows being less than the density of the wash liquid in the filter during wash stage with pressure released through said pressure release means, but the density of the pillows being greater than the density of the liquid when pressure is supplied through said fluid admission means, compressing the compressible fluid in the pillows.

10. The filter of claim 1, wherein said diaphragm means comprises a plurality of overlappable sheet-like leaflets.

11. The filter of claim 1, wherein said filter housing further comprises an upwardly domed top into which said diaphragm means is receiveable in released position, and wherein said liquid overflow means is located in said housing between the domed top and the level of the filter media.

12. The filter of claim 1, further comprising:
   (a) second liquid inlet means near the top of said filter media for admitting downflow liquid in opposition to that admitted through said first liquid inlet means;
   (b) wherein said liquid outlet means is spaced between said first and second liquid inlet means; and
   (c) said diaphragm means compresses the filter media to produce limited downflow in response to the fluid applied through said fluid admission means.

13. The filter of claim 1, further comprising pump means for supplying liquid to both said liquid inlet means and to said fluid admission means for applying liquid at equal pressure to be filtered and to pressurize said diaphragm means, the pressure drop across the filter media creating the sole pressure difference between the diaphragm and the filter media.

14. The filter of claim 1, wherein said granular filter media comprises:

(a) a lower media layer of particles having substantially similar densities and varying sizes;
   (b) an intermediate media layer of particles having substantially similar densities greater than the density of said first layer and sizes smaller than the particles of the first layer; and
   (c) an upper layer of particles having substantially similar densities less than the density of said first layer and sizes greater than said intermediate layer.

15. The filter of claim 1, wherein said diaphragm means comprises a flexible sheet of material having a central portion contacting the granular filter media during filter stage and having a peripheral portion contacting the side of the filter housing during filter stage, wherein said filter housing side further comprises an upwardly and outwardly flared portion for reducing the upward velocity of wash liquid passing through the filter media contained in the flared sides during wash stage and supporting said peripheral portion of the diaphragm during filter stage.

16. An improved upwash, upflow filter of the kind having graded granular filter media held in stationary position during filter stage and raised from stationary position by wash liquid during wash stage, wherein the improvement comprises: a filter housing containing said granular filter media and having upwardly and outwardly flared sides for reducing the upward velocity of wash liquid passing through the filter media contained between the flared sides during wash stage, wherein the housing has a wash liquid overflow near the upper end thereof and a wash liquid inlet near the lower end thereof and is characterized by a lack of constriction in the upward direction between the inlet and overflow for allowing improved selfgraded settling of the filter media after wash stage.

17. The filter of claim 16, wherein said filter housing has a lower portion ordinarily containing filter media during both filter and wash stages and an upper portion into which at least a portion of said filter media rises when suspended during wash stage, the improvement comprising said lower portion having a relatively small outward flare for allowing greater lifting during wash stage of larger media particles naturally graded at the bottom of the housing, and said upper portion having a relatively greater outward flare for superior containment against loss of fine media particles during wash stage.

18. The filter of claim 17, further comprising a circumferential liquid overflow outlet located in said upper part of the filter housing above the normal level to which filter media is suspended by rising wash liquid during wash stage.

* * * * *